(12) United States Patent
Hwang et al.

(10) Patent No.: US 9,815,372 B2
(45) Date of Patent: Nov. 14, 2017

(54) INSTRUMENT CLUSTER FOR VEHICLE

(71) Applicant: LG ELECTRONICS INC., Seoul (KR)

(72) Inventors: Sangroc Hwang, Seoul (KR); Taehyun Lim, Seoul (KR); Sooyeun Jung, Seoul (KR); Jaeseon Yoon, Seoul (KR); Moonsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/118,142

(22) PCT Filed: Feb. 5, 2015

(86) PCT No.: PCT/KR2015/001204
§ 371 (c)(1),
(2) Date: Aug. 11, 2016

(87) PCT Pub. No.: WO2015/122650
PCT Pub. Date: Aug. 20, 2015

(65) Prior Publication Data
US 2017/0166058 A1    Jun. 15, 2017

(30) Foreign Application Priority Data
Feb. 11, 2014    (KR) .................. 10-2014-0015614

(51) Int. Cl.
*B60R 16/02*    (2006.01)
*B60K 37/02*    (2006.01)
(Continued)

(52) U.S. Cl.
CPC ............. *B60K 37/02* (2013.01); *B60K 35/00* (2013.01); *B60K 37/04* (2013.01);
(Continued)

(58) Field of Classification Search
CPC ........ B60K 37/02; B60K 35/00; B60K 37/04; B60K 2350/40; B60K 2350/203;
(Continued)

(56) References Cited

U.S. PATENT DOCUMENTS

| 5,648,755 | A   | 7/1997  | Yagihashi |            |
|-----------|-----|---------|-----------|------------|
| 8,681,114 | B2  | 3/2014  | Hauschild |            |
| 8,892,341 | B2* | 11/2014 | McClellan | G07C 5/0816 |
|           |     |         |           | 701/115    |
| 9,129,460 | B2* | 9/2015  | McClellan | G07C 5/008 |

(Continued)

FOREIGN PATENT DOCUMENTS

JP    3168805 B2    5/2001
KR    10-2010-0138530 A1    12/2010
(Continued)

OTHER PUBLICATIONS

International Search Report dated May 8, 2015 for Application No. PCT /KR2015/001204, 4 pages.

*Primary Examiner* — Drew J Brown
(74) *Attorney, Agent, or Firm* — Fish & Richardson P.C.

(57) ABSTRACT

An instrument system for a vehicle includes a sensor unit configured to detect a state of a vehicle and to output a state value indicating the state of the vehicle; an output device configured to visually display the state value; and a control unit configured to detect a degree of change in the state value and to adjust, based on the degree of the change in the state value, an interval by which the output device displays the state value.

19 Claims, 8 Drawing Sheets

(51) Int. Cl.
  *B60K 35/00*   (2006.01)
  *B60K 37/04*   (2006.01)
  *G01D 11/28*   (2006.01)
  *B60R 16/023*  (2006.01)

(52) U.S. Cl.
  CPC .......... *B60R 16/0232* (2013.01); *G01D 11/28* (2013.01); *B60K 2350/1064* (2013.01); *B60K 2350/20* (2013.01); *B60K 2350/203* (2013.01); *B60K 2350/40* (2013.01); *B60K 2350/941* (2013.01)

(58) Field of Classification Search
  CPC ...... B60K 2350/941; B60K 2350/1064; B60K 2350/20; B60R 16/0232; G01D 11/28
  See application file for complete search history.

(56) References Cited

U.S. PATENT DOCUMENTS

| | | | |
|---|---|---|---|
| 9,409,481 B2* | 8/2016 | Choi | B60K 37/02 |
| 9,424,751 B2* | 8/2016 | Hodges | |
| 9,511,778 B1* | 12/2016 | Fuentes | B60W 40/09 |
| 2012/0105349 A1 | 5/2012 | Hauschild | |
| 2014/0132544 A1 | 5/2014 | Hauschild | |
| 2014/0182508 A1* | 7/2014 | Oishi | B60K 37/02 |
| | | | 116/62.3 |

FOREIGN PATENT DOCUMENTS

| | | |
|---|---|---|
| KR | 10-2012-0016110 A1 | 2/2012 |
| KR | 10-2012-0067216 A1 | 6/2012 |
| WO | WO 2010/125121 A1 | 11/2010 |
| WO | WO 2010/151059 A1 | 12/2010 |

\* cited by examiner

INSTRUMENT CLUSTER FOR VEHICLE

CROSS REFERENCE TO RELATED APPLICATIONS

This application is a U.S. National Phase Application under 35 U.S.C. §371 of International Patent Application No. PCT/KR2015/001204, filed on Feb. 5, 2015, which claims the benefit of Korean Patent Application No. 10-2014-0015614, filed on Feb. 11, 2014, the entire contents of which are hereby incorporated by reference in their entireties.

TECHNICAL FIELD

Implementations described herein relate to an instrument cluster for vehicles which displays information regarding the state of a vehicle without a sense of disconnectedness so that a user may easily confirm the information.

BACKGROUND

An instrument panel of a vehicle is installed in front of a driver seat and provides various pieces of information regarding the vehicle and operation thereof Through such an instrument panel, the driver may easily confirm various pieces of operation information, such as a driving speed and a driving distance of the vehicle, an engine RPM, etc., during driving.

A conventional vehicle instrument panel provides operation information through mechanical configurations. For example, an odometer to indicate a driving distance, a speedometer to display a speed, a tachometer to indicate an engine RPM, etc. are operated based on mechanical principles. However, some vehicle instrument panels include display devices that electronically display some pieces of driving information.

Since recent display devices for vehicles need to have functions added to central control elements displayed in the region of a vehicle dashboard and thus should satisfy higher design standards, an improvement on conventional designs or a replacement unit offering an improved design is required.

SUMMARY

Systems and techniques are described herein that provide an instrument cluster for vehicles that adaptively displays information regarding changes in various states of a vehicle. In some implementations, the particular times at which updated state values are displayed to a user depends on the degree of change in the state values.

In accordance with an aspect of the present invention, the above and other objects can be accomplished by the provision of an instrument cluster for vehicles including a sensor unit configured to sense the state of a vehicle and to output state values indicating the state of the vehicle, an output device configured to visually display the state values, and a controller configured to detect a degree of change in the state values, and to adjust the frequency by which adjusted state values are displayed by the output device during time other than points of time at which the output device receives the state values, based on the change degree in the state values.

In accordance with another aspect of the present invention, there is provided a method of controlling an instrument cluster for vehicles including receiving state values indicating the state of a vehicle, detecting a change degree in the state values, and determining the frequency of display of adjusted state values displayed during time other than points of time at which the state values are received, based on the change degree in the state values.

DETAILED DESCRIPTION

Systems and techniques are described herein that enable an instrument cluster for vehicles that provides a user with more stable and accurate information regarding changes in a state of the vehicle. In some implementations, the instrument cluster determines a degree of change in one or more state values of the vehicle, and adjusts the times at which the state values are displayed to a user, based on the change degree in the state values. As such, the instrument cluster may display information that more smoothly and accurately reflects the real-time changes in a vehicle's state values, thus mitigating large discontinuities or jumps in the state values that are displayed to a user.

The above and other objects, features and other advantages of the present invention will be more clearly understood from the following detailed embodiments taken in conjunction with the accompanying drawings. However, while the invention will be described in conjunction with exemplary embodiments, it will be understood that the present description is not intended to limit the invention to the exemplary embodiments. Throughout the specification, the same or similar elements are denoted by the same reference numerals even though they are depicted in different drawings.

The terms used in the following description serve only to describe specific embodiments and are not intended to restrict the present invention. Elements stated as a singular form used in the description of the invention and the claims will be interpreted as including a plural form unless stated otherwise. Expression of a term may indicate one or both of a singular form or a plural form of the term and vice versa.

Hereinafter, embodiments of the present invention will be described in detail with reference to the accompanying drawings.

Figure 1:
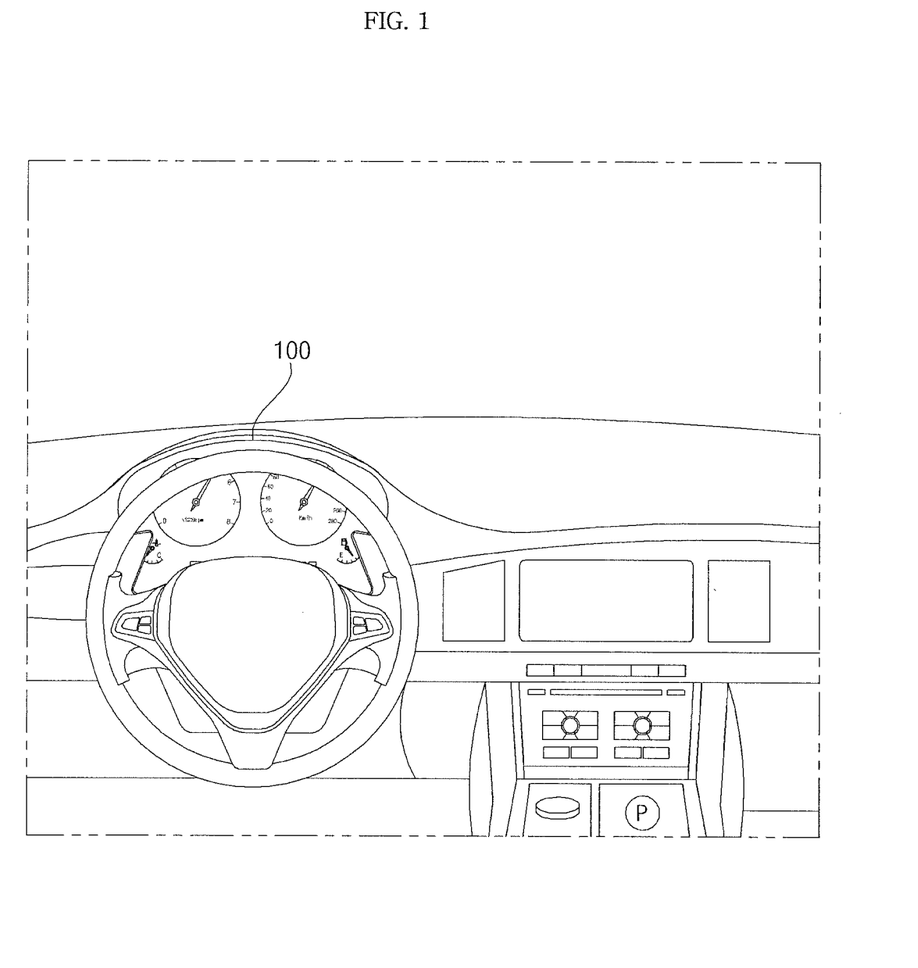
FIG. 1 is a view illustrating an instrument cluster for vehicles in accordance with one embodiment of the present invention, which is installed in a vehicle.
Figure 2:
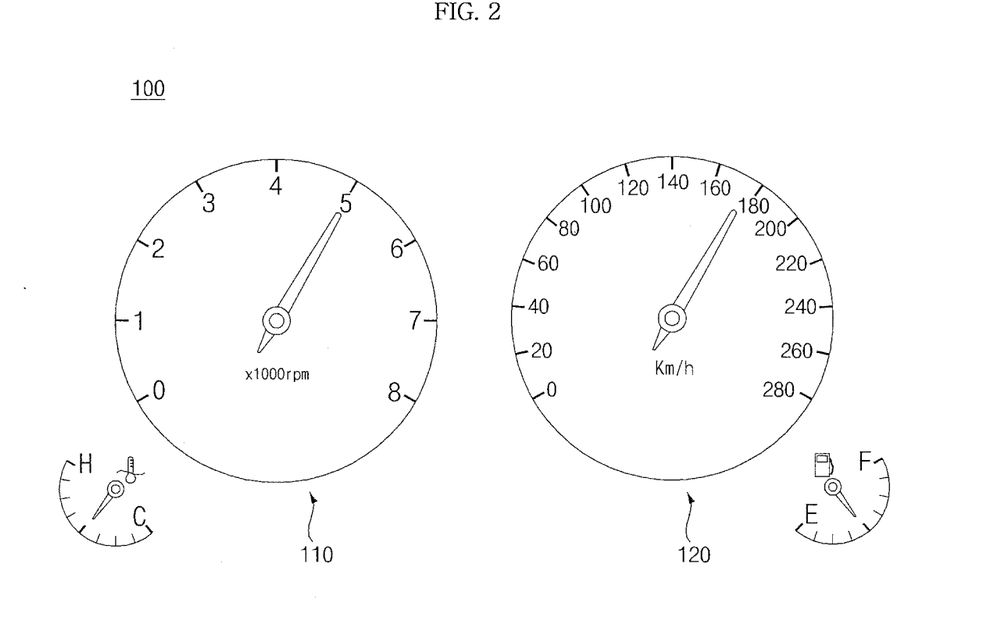
FIG. 2 is a front view illustrating the front surfaces of vehicle information display devices in accordance with one embodiment of the present invention.
Figure 3:
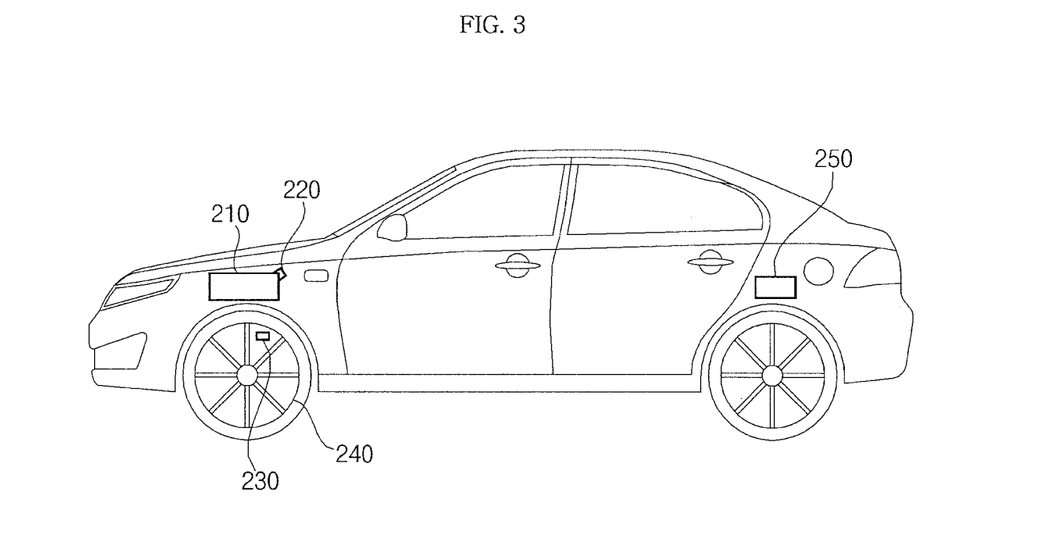
FIG. 3 is a view illustrating a sensor unit to detect the state of a vehicle in the instrument cluster for vehicles in accordance with one embodiment of the present invention.

FIG. 1 is a view illustrating an instrument cluster for vehicles in accordance with one embodiment of the present invention, which is installed in a vehicle, FIG. 2 is a front view illustrating the front surfaces of vehicle information display devices in accordance with one embodiment of the present invention, and FIG. 3 is a view illustrating a sensor unit to detect the state of a vehicle in the instrument cluster for vehicles in accordance with one embodiment of the present invention.

With reference to FIGS. 1 to 3, an instrument cluster 100 for vehicles in accordance with one embodiment of the present invention is disposed in front of a driver seat and thus allows a driver to frequently check the state of a vehicle.

With reference to FIG. 2, the instrument cluster 100 for vehicles in accordance with one embodiment may display, for example, an engine RPM 110, a vehicle speed 120, a remaining fuel quantity, etc. Although an instrument cluster 100 for vehicles in accordance with another embodiment in which a vehicle is operated by electric energy may display a motor RPM, a vehicle speed, a charged/discharged value of a vehicle battery, etc., the present invention is not limited to any one of these embodiments.

The instrument cluster 100 for vehicles may continuously check the state of the vehicle through a sensor unit. With reference to FIG. 3, as the sensor unit, a sensor 220 to sense an RPM of an engine 210, a sensor 230 to sense a speed of the vehicle through a method of detecting an RPM of wheels 240, a sensor 250 to sense a remaining quantity of fuel, a sensor to sense a charged/discharged value of a vehicle battery, or a sensor to sense an RPM of a motor may be used and different sensors may be used according to various embodiments.

The instrument cluster 100 for vehicles may check a degree of change in state values of the vehicle. For example, the instrument cluster 100 may determine whether a state value has changed by a large degree, or changed by a small degree. Based on the change degree of the state values, the instrument cluster 100 for vehicles may determine the frequency by which to display of state values. For example, a controller of the instrument cluster 100 for vehicles may receive a state value once at a designated time from the sensor unit, without being limited thereto, and the sensor unit may sense a state value once at a designated time.

The instrument cluster 100 for vehicles may display a state value at time between points of time at which the state values are received. The instrument cluster 100 for vehicles may display the state value at the point of time at which the state value is received and, if two state values are received, display an adjusted state value between the points of time at which the state values are received through an output device.

For example, if a state value is received, the instrument cluster 100 for vehicles may detect whether or not there is a recently received state value. If there is a recently received state value, the instrument cluster 100 for vehicles may detect a change degree in the two state values.

The instrument cluster 100 for vehicles may determine the frequency of display of state values based on the change degree in the state values. For example, the instrument cluster 100 for vehicles may detect the frequency of display of state values matching the change degree in the state values, based on a frequency table.

The instrument cluster 100 for vehicles may determine a plurality of points of output time to output state values. For example, the instrument cluster 100 for vehicles may determine points of output time and adjusted state values to be displayed at every points of output time based on a rate table.

The instrument cluster 100 for vehicles may determine an adjusted state value by adjusting a state value output from the sensor unit at a designated rate. In order to acquire the adjusted state value based on the rate table, the instrument cluster 100 for vehicles may determine the rate to adjust the state value output from the sensor unit.

The instrument cluster 100 for vehicles may adjust an interval between a plurality of points of output time to display state values depending on the frequency of display of state values. For example, the instrument cluster 100 for vehicles may adjust the interval between a plurality of points of output time based on the rate table which is stored in advance.

Although the specification describes the instrument cluster 100 for vehicles 100 as using a rate table to determine an interval between points of output time, a state value adjustment rate to set adjusted state values, etc., other types of tables may be used. The interval between points of output time and the state value adjustment rate to set adjusted state values are determined based on the frequency of display of state values and may thus be stored in other tables.

The instrument cluster 100 for vehicles may display a plurality of kinds of state values. The instrument cluster 100 for vehicles may store frequency tables and rate tables corresponding to the respective kinds of state values. For example, the instrument cluster 100 for vehicles may display various state values, such as an engine RPM, a vehicle speed or a remaining fuel quantity, a motor RPM, a vehicle speed or a charged/discharged value of a vehicle battery, etc., and frequency tables and rate tables corresponding to the respective state values may be stored.

Figure 4:
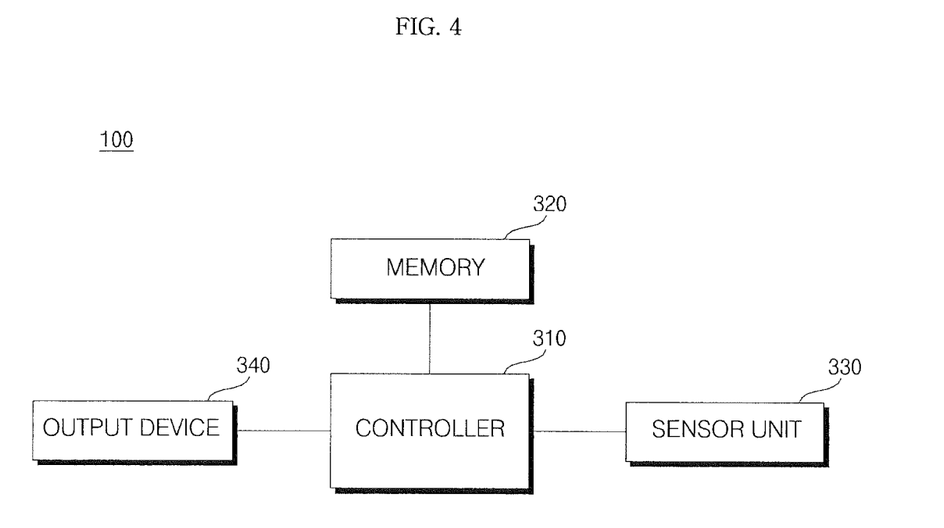
FIG. 4 is a block diagram illustrating elements of the instrument cluster for vehicles in accordance with one embodiment of the present invention.
Figure 5:
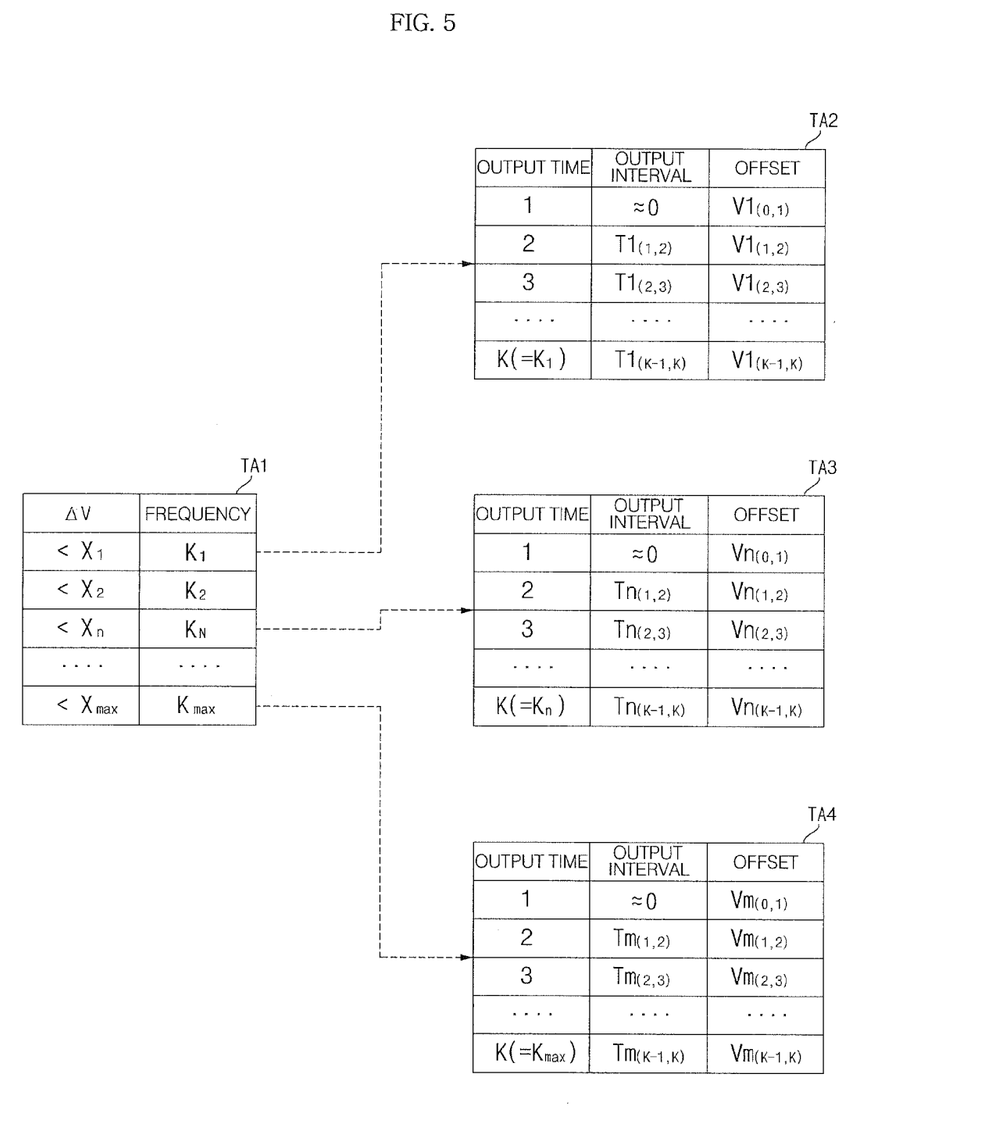
FIGS. 5 and 6 are views illustrating a data processing process in the instrument cluster for vehicles in accordance with one embodiment of the present invention.
Figure 6:
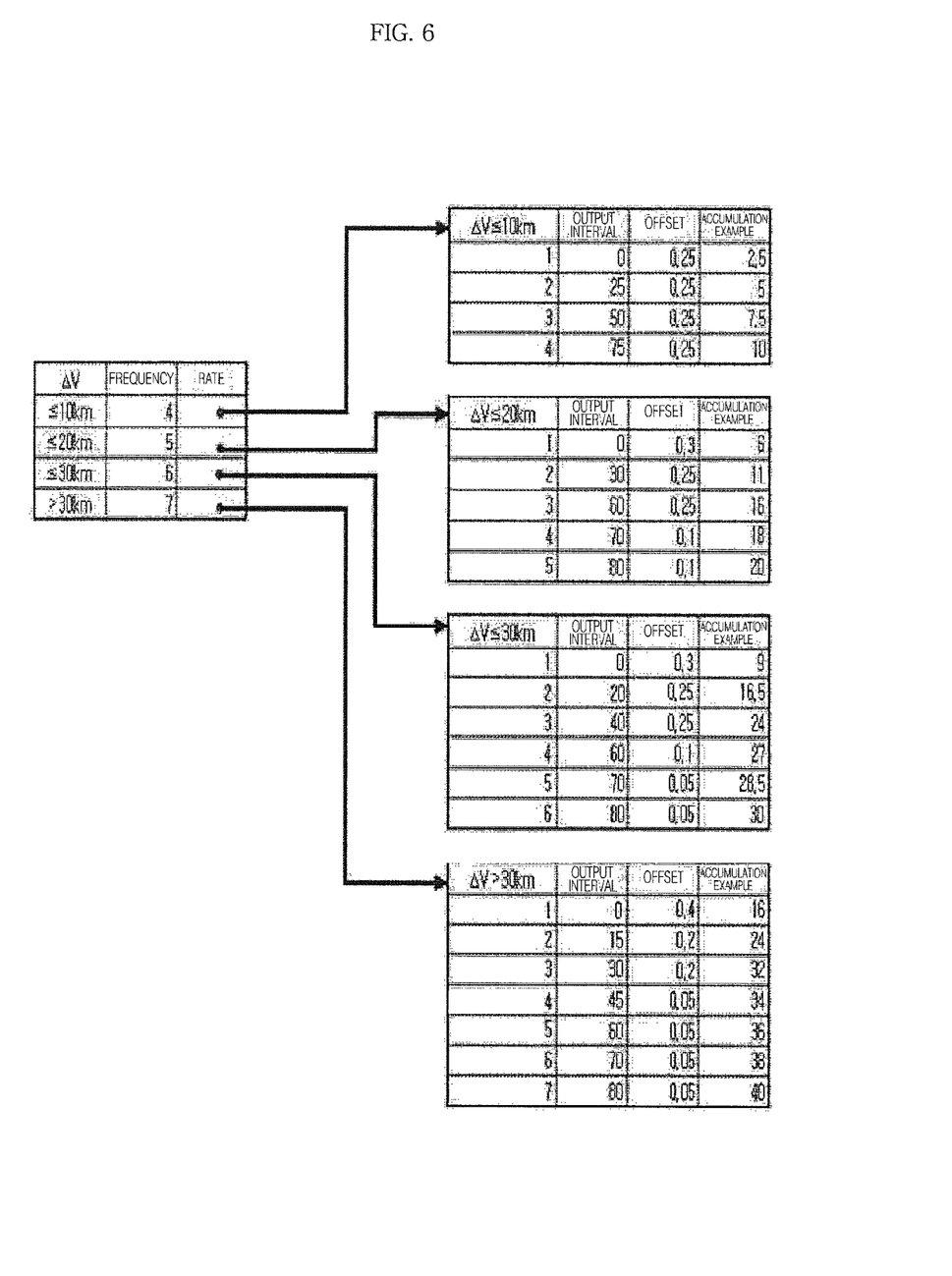

FIG. 4 is a block diagram illustrating elements of the instrument cluster 100 for vehicles in accordance with one embodiment of the present invention, and FIGS. 5 and 6 are views illustrating a data processing process in the instrument cluster 100 for vehicles in accordance with one embodiment of the present invention.

With reference to FIGS. 4 to 6, the instrument cluster 100 for vehicles may include a sensor unit 330 to sense the state of the vehicle and to output state values indicating the state of the vehicle, an output device 340 to visually display the state values, and a controller 310 to detect the change degree in the state values and to adjust the frequency of display of adjusted state values displayed during time other than points of time at which the output device 340 receives the state values, based on the change degree in the state values.

The controller 310 may determine the frequency of display of adjusted state values displayed during time other than points of time at which the state values are received from the sensor unit 330. The controller 310 may receive state values from the sensor unit 330. The state values may include an engine RPM, a vehicle speed, a remaining fuel quantity, a motor RPM, or a charged/discharged value of a vehicle battery, i.e., include all information regarding the state of the vehicle.

The controller 310 may receive state values depending on a predetermined cycle received from the sensor unit 330. The controller 310 may execute control operation based on reception cycles of a plurality of kinds of state values or information regarding time from the sensor unit 330, without being limited thereto.

The controller 310 may continuously check the state of the vehicle through the sensor unit 330. The controller 310 may receive state values from the sensor unit 330. The controller 310 may display the state values, received from the sensor unit 330, through the output device 340. The controller 310 may display adjusted state values based on a frequency table TA1 and rate tables TA2, TA3, and TA4, stored in a memory 320, through the output device 340 at a time when the state value is received from the sensor unit 330.

The controller 310 may check the kind of the state values received from the sensor unit 330. For example, the controller 310 may check which one, selected from among an engine RPM, a vehicle speed, a remaining fuel quantity, a motor RPM, or a charged/discharged value of the vehicle battery, the kind of state values received from the sensor unit 330 corresponds to.

The controller 310 may display the received state values through a designated region of the output device 340 depending on the kind of the received state values. The controller 310 may classify the received state values depending on kind and then continuously check a change degree in the state values.

If a state value is received, the controller 310 may check whether or not there is a history of reception of a state value having the same kind. The controller 310 may detect a difference between the currently received state value and the recently received state value. The controller 310 may determine a method of displaying the state value through the output device 340 based on the difference between the currently received state value and the recently received state value.

The controller 310 may receive state values from the sensor unit 330 at designated time intervals. The controller 310 may check a change degree in the state values for a predetermined time interval. The controller may check a change degree in state values using the difference between two state values.

The controller 310 may determine the frequency of display of adjusted state values based on the change degree in the state values. For example, the controller 310 may increase the frequency of display of adjusted state values, as the change degree in the state values increases, and decrease the frequency of display of adjusted state values, as the change degree in the state values decreases, without being limited thereto.

The controller 310 may acquire the frequency of display of adjusted state values matching the change degree in the state values, based on the frequency table TA1 stored in the memory 320. In the frequency table, a difference between two state values may match the frequency of display of adjusted state values displayed through the output device 340.

For example, in the case that the kind of state values corresponds to the speed of the vehicle, the controller 310 of the vehicle may determine four as the frequency of display of adjusted state values, if the difference between two state values is 10 km/h or less. The controller 310 of the vehicle may determine five as the frequency of display of adjusted state values, if the difference between the two state values exceeds 10 km/h and is 20 km/h or less. The controller 310 of the vehicle may determine six as the frequency of display of adjusted state values, if the difference between the two state values exceeds 20 km/h and is 30 km/h or less. The controller 310 of the vehicle may determine seven as the frequency of display of adjusted state values, if the difference between the two state values exceeds 30 km/h. However, the above conditions may be changed depending on the configuration of the frequency table.

The controller 310 may divide time between points of time at which the two state values are received into a plurality of time sections, based on the frequency determined depending on the frequency table. The controller 310 may determine an interval between a plurality of points of output time by applying the frequency of display of adjusted state values determined depending on the frequency table to the rate table.

The controller 310 may determine a plurality of points of output time to output adjusted state values to the output device 340 by dividing time between points of time at which the two state values are received into a plurality of time sections. The controller 310 may determine a plurality of points of time to output adjusted state values based on the rate table. The controller 310 may divide time between the points of time at which the two state values are received into the same number of time sections as the frequency determined based on the frequency table.

The controller 310 may select a rate table corresponding to the frequency determined based on the frequency table. For example, if the frequency determined based on the frequency table is K1, the controller 310 may select the rate table TA2 corresponding thereto. The controller 310 may determine points of time to output adjusted state values based on the rate table TA2 matching the frequency determined based on the frequency table.

The controller 310 may adjust an interval between points of output time depending on the change degree in the state values. The controller 310 may determine an interval between points of time, which varies according to the respective points of output time.

The controller 310 may determine adjusted state values displayed by the output device 340 at points of output time. The controller 310 may determine an adjustment rate (offset) to determine adjusted state values output to the output device 340 at the points of output time, based on the rate table TA2 matching the frequency determined based on the frequency table.

The controller 310 may determine adjusted state values based on the adjustment rate (offset). The adjustment rate may be a rate to be adjusted to extract an adjusted state value from the recently received state value at each point of output time.

The controller 310 may determine whether or not an adjustment rate to adjust the state values is differentially applied at the respective points of output time, based on the frequency of display of adjusted state values determined based on the frequency table. The controller 310 may determine an adjusted state value by adjusting a state value at the adjustment rate, as a point of output time becomes distant from the point of time when the state value is received. The adjustment rate may be determined by a rate table. The adjustment rate may vary depending on the frequency of display of adjusted state values.

For example, if a state value has a positive change degree, the controller 310 may determine an adjusted state value by adding a value corresponding to the adjustment rate to the recent state value. If a state value has a negative change degree, the controller 310 may determine an adjusted state value by subtracting a value corresponding to the adjustment rate from the recent state value.

The controller 310 may display adjusted state values through the output device 340 at a plurality of points of output time. The controller 310 may display adjusted state values, adjusted at an adjustment rate at each point of output time, through the output device 340.

The controller 310 may analyze information of the output device 340. The controller 310 may receive identification information from the output device 340 and thus detect an output scheme, a shape, etc. of the output device 340.

The controller 310 may adjust a state value display degree depending on the output scheme, shape, etc. of the output device 340, without being limited thereto. For example, the controller 310 may adjust an adjustment rate by the rate table or a point of output time depending on the shape or scale interval of a portion of the output device 340 to display state values, without being limited thereto.

The memory 320 may include a high-speed random access memory. The memory 320 may include at least one of a magnetic disk storage device, a flash memory device or non-volatile memories, such as other non-volatile solid state memory devices, without limitation thereto, and include a readable storage medium.

For example, the memory 320 may include an EEP-ROM (Electrically Erasable and Programmable Read Only Memory), without being limited thereto. In the EEP-ROM, information may be written and erased by the controller 310, during operation of the controller 310. The EEP-ROM may be a memory device in which stored information may be maintained without being erased, even if power supplied to the instrument cluster for vehicles is switched off and thus power supply is stopped.

The memory 320 may store various programs or data in connection with the controller 310. The memory 320 may store programs necessary for the controller 310 to control the output device 340.

The memory 320 may store the frequency table TA1, in which the frequency of display of adjusted state values for a designated time through the output device 340 is set based on the change degree in state values. In order to acquire adjusted state values which will be displayed at a plurality of points of output time, the memory 320 may store rate tables TA2, TA3 and TA4 in which the degrees of adjustments of state values at designated rates are regulated.

In the rate tables TA2, TA3 and TA4, points of output time may be determined depending on the frequency of display of adjusted state values. In the rate tables TA2, TA3 and TA4, intervals between a plurality of points of output time may be determined. In the rate tables TA2, TA3 and TA4, intervals between a plurality of points of output time may be equal or different depending on the frequency of display of adjusted state values. In the rate tables TA2, TA3 and TA4, whether or not intervals between a plurality of points of output time are set differently may be determined depending on the change degree in state values.

In rate tables of an instrument cluster for vehicles in accordance with one embodiment, shown in FIG. 6, points of output time and adjustment rates may be determined based on a change degree in a vehicle speed, which is one of state values, and numerical values thereof may vary according to design methods and, thus, the disclosure is not limited thereto.

In rate tables, intervals between points of output time may be set depending on the change degree in state values.

[If a Vehicle Speed is 10 km/h or Less]

At the moment that the controller 310 receives a state value, the controller 310 may display an adjusted state value having an adjustment rate of 0.25 to the output device 340. Based on 4 as the frequency of display of adjusted state value, the controller 310 may divide time between at a point of time when the state value is received and a point of time when a next state value is received into 4 time sections and thus determine points of output time. The controller 310 may set the same adjustment rate of 0.25 at the respective points of output time and thus determine adjusted state values. The controller 310 may set the same interval between points of output time, if the vehicle speed is 10 km/h or less.

[In Other Cases]

The controller 310 may set different intervals between a plurality of points of output time. Based on 5 as the frequency of display of adjusted state values, the controller 310 may divide time between at a point of time when a state value is received and a point of time when a next state value is received into 5 time sections and thus determine points of output time. Here, the controller 310 may divide time between at a point of time when the state value is received and a point of time when a next state value is received into a plurality of time sections at different intervals.

In rate tables, adjustment rates to calculate adjusted state values at points of output time may be different at the respective points of output time. Therethrough, the instrument cluster for vehicles may display the state of the vehicle without a sense of disconnectedness even at the time when the controller 310 does not receive a state value from the sensor unit 330.

The sensor unit 330 may sense the state of the vehicle. The kind of received state values indicating the state of the vehicle sensed by the sensor unit 330 may be one of an engine RPM, a vehicle speed, a remaining fuel quantity, a motor RPM and a charged/discharged value of the vehicle battery, without being limited thereto.

The sensor unit 330 may include at least one of a sensor to sense an RPM of the engine, a sensor to sense a speed of the vehicle through a method of detecting an RPM of wheels, a sensor to sense a remaining quantity of fuel, a sensor to sense a charged/discharged value of the vehicle battery, and a sensor to sense an RPM of the motor.

The sensor unit 330 may provide sensed state values regarding the state of the vehicle to the controller 310. The sensor unit 330 may provide the state values to the controller 310 based on a predetermined cycle.

Figure 7:
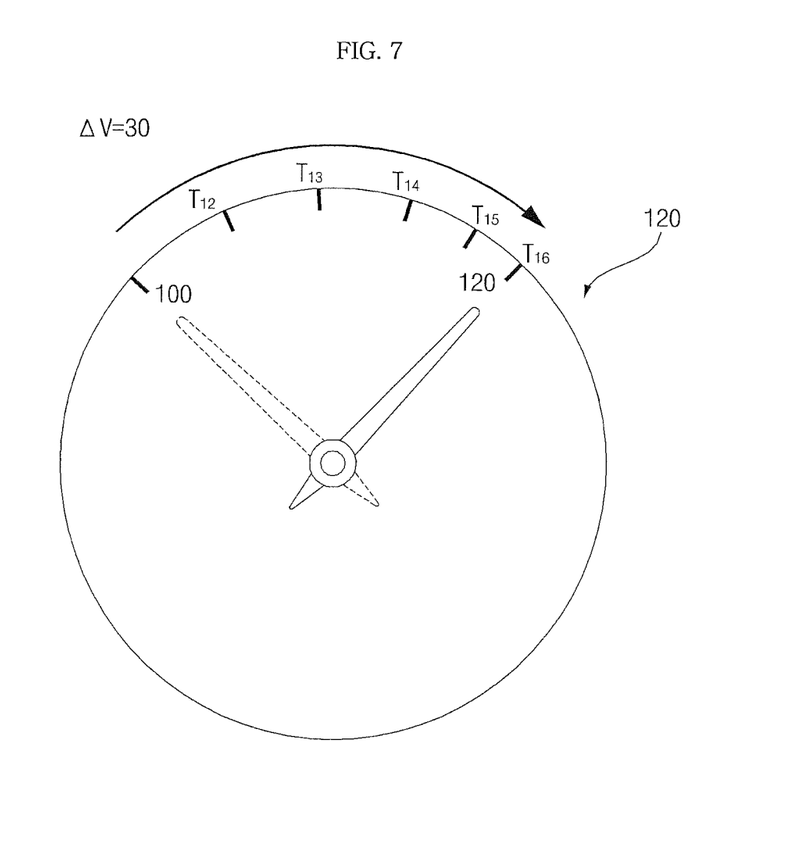
FIGS. 7 and 8 are views illustrating an output method in the instrument cluster for vehicles in accordance with one embodiment of the present invention.
Figure 8:
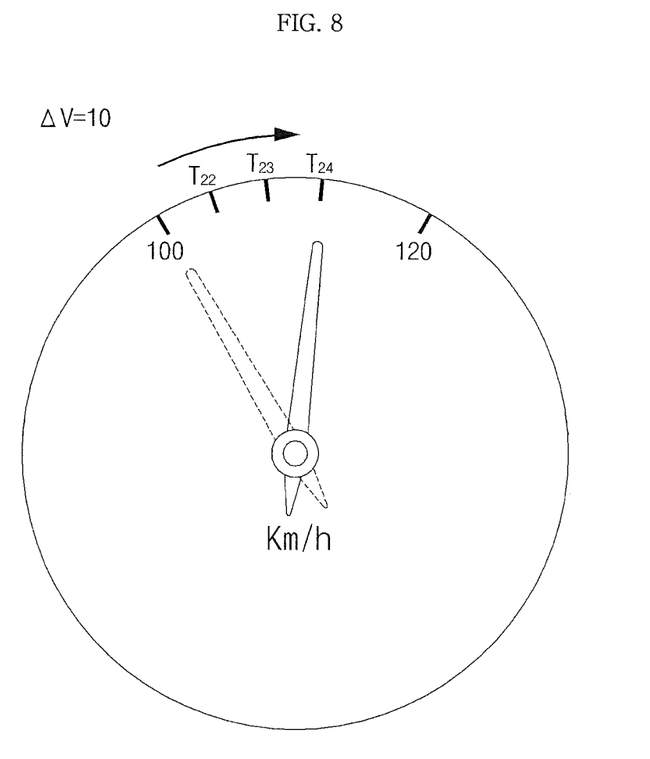

FIGS. 7 and 8 are views illustrating an output method in the instrument cluster for vehicles in accordance with one embodiment of the present invention.

With reference to FIGS. 7 and 8, in the instrument cluster for vehicles in accordance with one embodiment of the present invention, adjustment rates applied to points of output time may vary according to change degrees in state values.

FIG. 7 illustrates a display state of an output device 120 if the kind of a state value is a speed of the vehicle.

The output device 120 may display an adjusted state value at a point of time T1 at which the controller receives a state value from the sensor unit. If the change degree in a speed of the vehicle is 30 km/h, intervals between a plurality of points of output time through the output device 120 may each have a different duration. For example, an interval between successive points of output time may be decreased as time goes by (from T1 to T16), although implementations are necessarily limited thereto, and other suitable variations in intervals between points may be used.

The output device 120 may display adjusted state values at points of output time determined based on rate tables. For example, intervals between the successive points of output time may be different and the change of an adjustment rate according to a change of the point of output time may not be uniform.

FIG. 8 illustrates a display state of the output device 120 if the kind of a state value is a speed of the vehicle and a change degree in the state value is 10 km/h.

Intervals between points of output time to display adjusted state values through the output device 120 may be varied according to the change degree in the state value. If the change degree in the state value is 10 km/h or less, the intervals between the points of output time may be uniform. If the change degree in the state value is 10 km/h or less, adjustment rates to determine adjusted state values displayed by the output device 120 at the points of output time may be uniform, but are not limited thereto.

Whether or not the adjustment rates to determine the adjusted state values displayed by the output device 120 become uniform may be determined depending on the change degree in the state value.

The output device 120 may display an adjusted state value at a point of time T2 at which the controller receives a state value from the sensor unit. The adjusted state value may be displayed depending on a uniform adjustment rate from the point of time at which the controller receives the state value to a point of time at which the controller receives a next state value, without being limited thereto.

Figure 9:
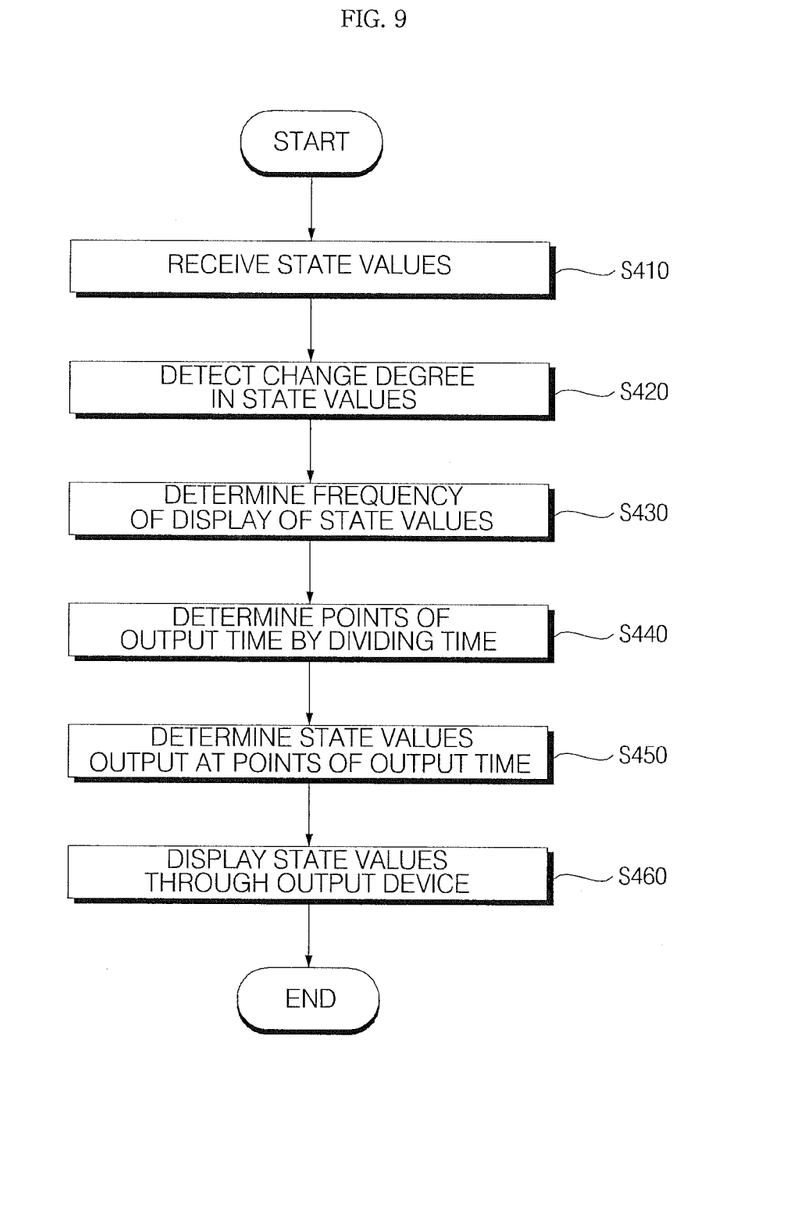
FIG. 9 is a flowchart illustrating a method of controlling an instrument cluster for vehicles in accordance with one embodiment of the present invention.

FIG. 9 is a flowchart illustrating a method of controlling an instrument cluster for vehicles in accordance with one embodiment of the present invention.

With reference to FIG. 9, a method of controlling an instrument cluster for vehicles in accordance with one embodiment of the present invention may include receiving state values indicating the state of a vehicle (Operation S410), detecting a change degree in the state values (Operation S420), and determining the frequency of display of adjusted state values during time other than points of time at which the state values are received, based on the change degree in the state values (Operation S430).

In reception of the state values indicating the state of the vehicle (Operation S410), a sensor unit to sense various states of the vehicle may provide state values to a controller. In reception of the state values indicating the state of the vehicle (Operation S410), the state values received from the sensor unit may be stored. In reception of the state values indicating the state of the vehicle (Operation S410), if a state value from the sensor unit is received, whether or not there is a state value stored in advance may be judged. In reception of the state values indicating the state of the vehicle (Operation S410), the state values received from the sensor unit may be stored.

In reception of the state values indicating the state of the vehicle (Operation S410), the state values may be received depending on a predetermined cycle. In reception of the state values indicating the state of the vehicle (Operation S410), control operation may be executed based on reception cycles of a plurality of kinds of state values or information regarding time, without being limited thereto.

In reception of the state values indicating the state of the vehicle (Operation S410), the state of the vehicle may be continuously checked. In reception of the state values indicating the state of the vehicle (Operation S410), the kind of the received state values may be checked. In reception of the state values indicating the state of the vehicle (Operation S410), which one, selected from among an engine RPM, a vehicle speed, a remaining fuel quantity, a motor RPM, or a charged/discharged value of a vehicle battery, the kind of the received state values corresponds to may be determined.

In detection of the change degree in the state values (Operation S420), if there is a state value which is stored in advance, a difference between the currently received state value and the recently received state value may be detected. In detection of the change degree in the state values (Operation S420), whether or not there is a history of reception of a state value having the same kind as the received state value may be checked.

In detection of the change degree in the state values (Operation S420), a difference between the currently received state value and the recently received state value may be detected. In detection of the change degree in the state values (Operation S420), the change degree in the state values may be determined as a difference between two state values received at a designated time interval.

In detection of the change degree in the state values (Operation S420), the change degree in the state values may be detected using a difference between two state values. In detection of the change degree in the state values (Operation S420), a change degree in the state values for a predetermined time interval may be checked.

In determination of the frequency of display of adjusted state values displayed during time other than points of time at which the state values are received based on the change degree in the state values (Operation S430), the frequency of display of adjusted state values may be detected by applying the change degree in the state values to a rate table. In determination of the frequency of display of adjusted state values (Operation S430), the frequency of display of adjusted state values may vary according to the change degree in the state values.

In determination of the frequency of display of adjusted state values (Operation S430), the frequency of display of adjusted state values may be increased, as the change degree in the state values increases, without being limited thereto. Here, the state value may include an engine RPM engine, a vehicle speed, a remaining fuel quantity, a motor RPM, or a charged/discharged value of a vehicle battery, i.e., include all information regarding the state of the vehicle.

In determination of the frequency of display of adjusted state values (Operation S430), the frequency of display of adjusted state values may be decreased, as the change degree in the state values decreases, without being limited thereto.

In determination of the frequency of display of adjusted state values (Operation S430), the frequency of display of adjusted state values matching the change degree in the state values may be detected based on a stored frequency table. In the frequency table, a difference value between two state values may match the frequency of display of adjusted state values through the output device.

In the method of controlling an instrument cluster for vehicles in accordance with one embodiment may further include determining points of output time by dividing time (Operation S440), determining adjusted state values output at the points of output time (Operation S450), and displaying the adjusted state values through the output device (Operation S460).

In determination of points of output time by dividing time (Operation S440), time between points of time at which the two state values are received may be divided into a plurality of time sections based on the frequency determined by the frequency table.

In determination of points of output time by dividing time (Operation S440), an interval between a plurality of points of output time may be determined by applying the frequency determined based on the frequency table to a rate table. In determination of points of output time by dividing time (Operation S440), a plurality of points of time to output adjusted state values to the output device may be determined by dividing time between the points of time at which the two state values are received into a plurality of time sections.

In determination of points of output time by dividing time (Operation S440), the points of output time may be determined based on the rate table. In determination of points of output time by dividing time (Operation S440), time between the points of time at which the two state values are received may be divided into the same number of time sections as the frequency determined based on the frequency table.

In determination of points of output time by dividing time (Operation S440), a rate table corresponding to the frequency determined based on the frequency table may be selected. In determination of points of output time by dividing time (Operation S440), points of output time may be determined based on the rate table matching the frequency determined based on the frequency table.

In determination of points of output time by dividing time (Operation S440), an interval between points of output time may be adjusted depending on the change degree in the state values. In determination of points of output time by dividing time (Operation S440), an interval between points of time may be determined so as to vary at the respective points of time.

In determination of adjusted state values output at the points of output time (Operation S450), the adjusted state values displayed by the output device at the points of output time may be determined. In determination of adjusted state values output at the points of output time (Operation S450), an adjustment rate (offset) to determine adjusted state values output to the output device at the points of output time may be determined based on the rate table matching the frequency determined based on the frequency table.

In determination of adjusted state values output at the points of output time (Operation S450), adjusted state values may be determined based on the adjustment rate (offset). The adjustment rate may be a rate to be adjusted to extract an adjusted state value from the recently received state value at each point of output time.

In determination of adjusted state values output at the points of output time (Operation S450), whether or not an adjustment rate to adjust the state values is differentially applied at the respective points of output time may be determined based on the frequency of display of adjusted state values determined based on the frequency table. In determination of adjusted state values output at the points of output time (Operation S450), an adjusted state value may be determined by adjusting a state value at the adjustment rate as the point of output time becomes distant from the point of time when the state value is received. The adjustment rate may be determined by the rate table. The adjustment rate may vary depending on the frequency of display of adjusted state values.

In determination of adjusted state values output at the points of output time (Operation S450), if a state value has a positive change degree, an adjusted state value may be determined by adding a value corresponding to the adjustment rate to the recent state value. In determination of adjusted state values output at the points of output time (Operation S450), if a state value has a negative change degree, an adjusted state value may be determined by subtracting a value corresponding to the adjustment rate from the recent state value.

In display of the adjusted state values through the output device (Operation S460), the adjusted state values may be displayed through the output device at a plurality of points of output time. In display of the adjusted state values through the output device (Operation S460), the adjusted state values, adjusted by an adjustment rate at each point of output time, may be displayed through the output device.

In an instrument cluster for vehicles and a method of controlling the same in accordance with one embodiment of the present invention, the state of a vehicle is sensed and an interval, by which state values indicating the state of the vehicle are displayed, is adjusted based on a change degree in the state values, thereby providing information without a sense of disconnectedness and thus stably providing the information to a user.

In the instrument cluster for vehicles and the method of controlling the same in accordance with one embodiment of the present invention, state values are displayed based on a frequency table in which the frequencies of displaying the state values are set depending on the change degree in the state values, thereby remarkably improving an information processing speed, as compared to calculation using a mathematical equation.

In the instrument cluster for vehicles and the method of controlling the same in accordance with one embodiment of the present invention, change in state values is continuously confirmed and thus information may be flexibly displayed while corresponding to the change in the state values in real time.

In the instrument cluster for vehicles and the method of controlling the same in accordance with one embodiment of the present invention, if a change in state values is severe, time between points of time at which two state values are received is divided into different time intervals and thereby the state values are displayed, thereby minimizing a sense of visual disconnectedness felt by a driver.

Although all constituent elements may be implemented as respective independent hardware, some or all of the respective constituent elements may be selectively combined and thus implemented as a computer program having a program module in which one or plural hardware executes functions of the combination of some or all of the respective constituent elements.

Although the preferred embodiments of the present invention have been disclosed for illustrative purposes, these embodiments do not limit the technical scope and spirit of the invention. Those skilled in the art will appreciate that various modifications, additions and substitutions are possible, without departing from the scope and spirit of the invention as disclosed in the accompanying claims.

The present invention is applicable to an instrument cluster for vehicles, and particularly, to an instrument cluster for vehicles which displays information regarding the state of a vehicle.

What is claimed is:

1. An instrument cluster for vehicles, comprising:
    a sensor unit configured to sense a state of a vehicle and to output state values indicating the state of the vehicle;
    an output device configured to visually display the state values; and
    a controller configured to:
        detect a change degree indicating changes in the state values; and
        based on the change degree in the state values, adjust a frequency of displaying adjusted state values that are displayed by the output device at times other than points of time at which the output device receives the state values.

2. The instrument cluster for vehicles according to claim 1, further comprising a memory configured to store a frequency table comprising indications of the frequencies of displaying the adjusted state values for a designated time based on the change degree in the state values.

3. The instrument cluster for vehicles according to claim 2, wherein the controller is further configured to:
    receive a plurality of state values from the sensor unit by predetermined time intervals; and
    detect a difference between a currently received state value and a recently received state value.

4. The instrument cluster for vehicles according to claim 3, wherein, in the frequency table, the difference between the currently received state value and the recently received state value matches the frequency of display of the adjusted state values through the output device.

5. The instrument cluster for vehicles according to claim 2, wherein, when the controller receives two state values from the sensor unit, the controller divides time between points of time at which the two state values are received based on the frequency table.

6. The instrument cluster for vehicles according to claim 1, wherein the controller is further configured to:
divide time between the most adjacent two points of time at which the state values are received into a plurality of time sections, based on the change degree in the state values; and
determine a plurality of points of output time to output the adjusted state values through the output device.

7. The instrument cluster for vehicles according to claim 6, wherein the controller is further configured to detect adjusted state values displayed by the output device at the points of output time.

8. The instrument cluster for vehicles according to claim 5, wherein the memory stores rate tables in which adjustment rates to adjust the state values are regulated, in order to acquire the adjusted state values displayed at the points of output time.

9. The instrument cluster for vehicles according to claim 7, wherein the controller determines whether or not time between the points of time at which the two state values are received is divided into a plurality of time sections at different intervals, based on the change degree in the state values.

10. The instrument cluster for vehicles according to claim 1, wherein the state value are one of speed values of the vehicle, RPMs of an engine or a motor of the vehicle, and charged/discharged values of a vehicle battery.

11. A method of controlling an instrument cluster for vehicles, comprising:
receiving state values indicating the state of a vehicle;
detecting a change degree indicating changes in the state values; and
based on the change degree in the state values, determine a frequency of displaying adjusted state values that are displayed at times other than points of time at which the state values are received.

12. The method according to claim 11, wherein, detecting the change degree in the state values comprises detecting a difference between a currently received state value and a recently received state value.

13. The method according to claim 12, wherein, in determining the frequency of display of the adjusted state values, the frequency of display of the adjusted state values matching the difference between the currently received state value and the recently received state value is detected from a frequency table in which the frequency of displaying the adjusted state values through an output device is set based on the change degree in the state values.

14. The method according to claim 13, further comprising dividing time between points of time at which two state values are received into the same number of time sections as the frequency.

15. The method according to claim 14, wherein, in division of time between the points of time at which the two state values are received into the same number of time sections as the frequency, a plurality of points of output time to output the adjusted state values is determined by dividing the time between the points of time at which the two state values are received into a plurality of time sections at different intervals.

16. The method according to claim 15, further comprising detecting adjusted state values displayed at points of output time other than the points of time at which the state values are received, out of the points of output time.

17. The method according to claim 16, wherein, in detection of the adjusted state values, the adjusted state value is determined by adjusting the state value at the adjustment rate, as the point of output time becomes distant from the point of time at which the state value is received.

18. The method according to claim 17, wherein, in detection of the adjusted state values, whether or not the adjustment rate is differentially applied to the respective points of output time is determined based on the frequency.

19. The method according to claim 15, further comprising displaying the adjusted state values through the output device at the points of output time.

* * * * *